United States Patent Office 3,275,377
Patented Sept. 27, 1966

3,275,377
WHEEL FOR A TUBELESS TIRE
René Lucien, Neuilly-sur-Seine, France, assignor to Societe a Responsabilite Limitee: Recherches Etudes Production R.E.P., Paris, Seine, France
Filed July 29, 1964, Ser. No. 385,966
Claims priority, application France, July 30, 1963, 943,196, Patent 1,371,947
1 Claim. (Cl. 301—6)

The invention relates to a wheel for a vehicle or aircraft specially adapted for the support of a tubeless tire.

Tubeless tires have become increasingly popular. However, when this type of tire made its appearance on the market, it was fitted on wheels for tires with inner tubes which are modified only in respect of the air-tightness of the wheel and the fitting of the valve. An absolute necessity for a wheel intended to receive a pneumatic tire with an inner tube is the presence of a continuous rim supporting the inner tube against its air pressure which it is not able to withstand alone. For this reason, the normal wheels have been made with a central rim, the fitting of the pneumatic tire being effected by various means such as bolts, removable rims, etc.

However, this essential rim involves a large number of drawbacks. One of these drawbacks is a defective transmission of the forces produced by the ground along walls having joints at their common points with the rim. Another of these drawbacks is the weight of the rim, which by reason of its position far from the axis, increases the inertia of the wheel. Still a further drawback is the complication of manufacture and the high cost price which results.

The applicants have observed that the conventional rim is no longer essential for a pneumatic tubeless tire, and that the elimination of the conventional rim permits of improvements which have been prevented up to the present time by the rim and which are of considerable importance.

The invention has thus for an object the provision of a rimless wheel for a tubeless pneumatic tire.

The invention has a further object to provide a wheel of this kind, which ensures remarkably good transmission of forces from the ground.

The invention has also for an object, the provision of a wheel of this kind, which has small weight and moment of gyration for the same performance.

The invention has as a further object the provisions of a wheel of this kind, which permits the parts of the brake to be easily housed, in spite of their substantial volume.

The invention has another object which is to provide a wheel of this kind which is very simple to manufacture and the cost of which is very low.

The wheel according to the invention is composed of two independent halves which are generally symmetrical with respect to a central plane of the pneumatic tire, each half being in the form of a frusto-conical disc, the large base of which receives a respective one of the two beads of the pneumatic tire while the small base is mounted on the wheel hub, said small bases of the two discs being turned towards each other.

The invention provides furthermore that each of these frusto-conical discs may be mounted on the hub by means of cones with locking nuts.

By stating that the two frusto-conical discs are generally symmetrical, it is meant that apart from the obvious conventional asymmetrical parts (valve, parts of the brake, etc.), modification can be made to the basic symmetry according to questions of choice or opportunity.

The above arrangements and their advantages, together with other arrangements and other advantages of the invention, will be described in more detail with reference to the accompanying drawings, given by way of example and without any limitative sense, in which.

Figure 1:
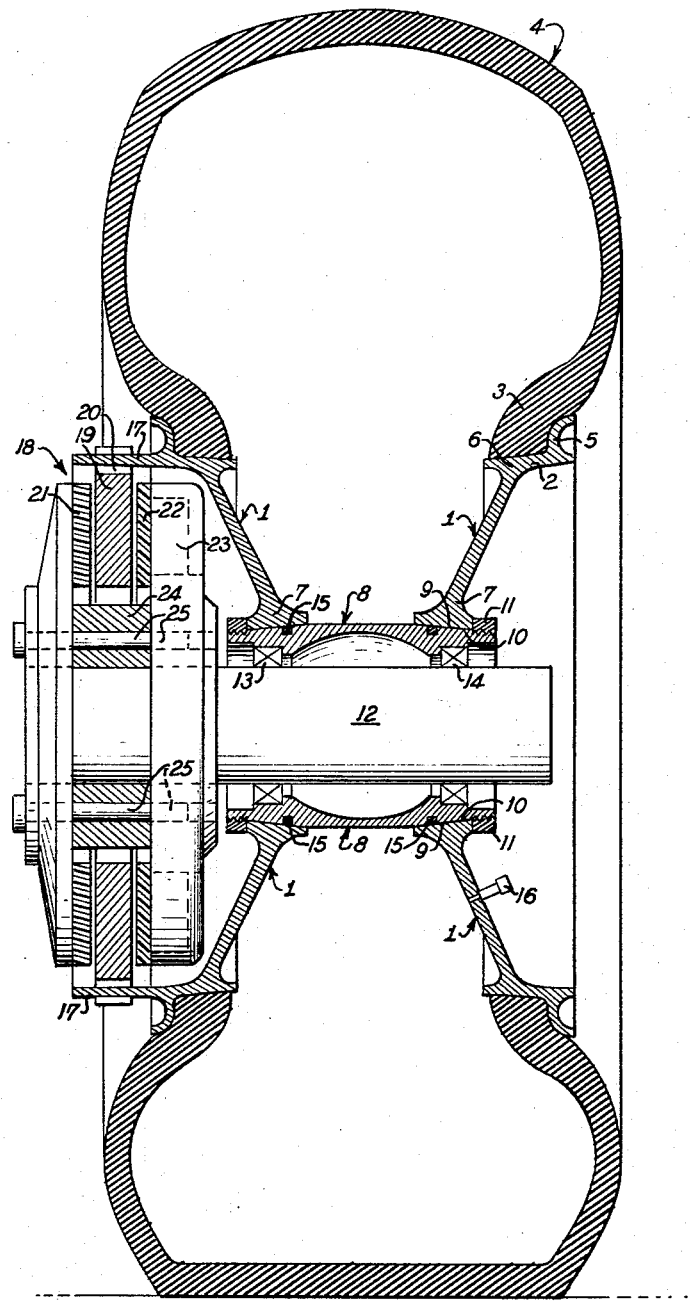
FIG. 1 is a vertical axial section of a wheel according to the invention.
Figure 2:
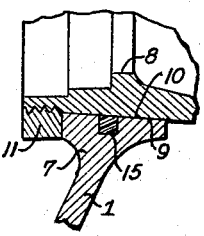
FIG. 2 is a detail of FIG. 1, showing a further arrangement of the air-tight linings.

On each side of the wheel according to the invention, as shown in FIG. 1, a half-wheel is constituted by a frusto-conical disc 1, the large base 2 of which is arranged to receive the bead 3 of the pneumatic tire 4 by means of a shoulder 5 and a bead support 6 which is the minimum width necessary to hold the bead 3. The small bases 7 of the two frusto-conical discs 1 are turned towards each other and are mounted in a rigid but removable manner on the hub 8. For example, as shown in FIG. 1, the small base 7 of the frusto-conical disc 1 is formed as a female cone 9 forced which is against a male cone 10 on the hub 8 by a nut 11 screwed axially on the said hub. The hub 8 is mounted in a conventional manner on the axle 12, for example by means of bearings 13 and 14. Fluid-tightness is ensured by means of packings 15 which may be carried by the hub (FIG. 1) or by the disc (FIG. 2). The inflating valve 16 may be mounted on any part of one of the discs 1 and in particular at the point thereof subject to least stresses.

Figure 3:
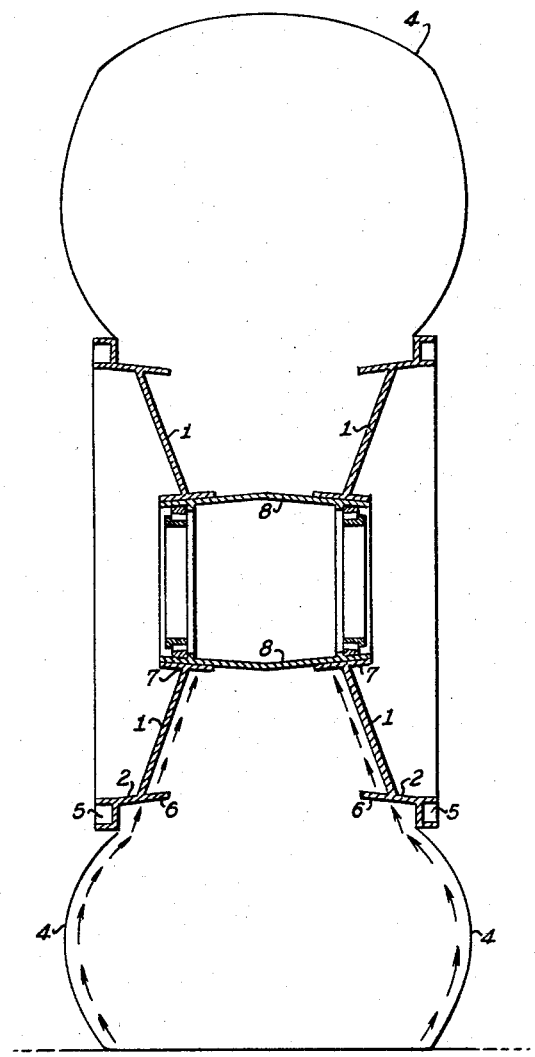
FIG. 3 shows the stress pattern of the wheel according to the invention.

The invention has the following advantages:

The stresses coming from the ground through the intermediary of the pneumatic tire are retransmitted to the wheel bearings in a much more direct manner than in a conventional type of wheel with a rim. This advantage is clearly shown in FIG. 3 in which the transmission of stresses to the hub is represented by arrows for the wheel according to the invention. Such stress transmission is along a substantially straight path from the ground to the hub whereas in the construction according to the prior art the stress path includes portions at right angles to one another.

For this reason, the weight of the wheel, for the same performance, may be much lower than that of a conventional wheel, for which it is necessary to add the weight of all the portion of the rim located between the two bead supports and also the zones, which are locally reinforced to a considerable extent, for the fixing devices of the two half-wheels or of the removable shoulder. This fixing arrangement, generally formed by a plurality of bolts under tension, is very weak in fatigue, and is replaced in the wheel according to the invention by the two nuts 11 (FIG. 1) which are much lighter and are subjected to shear stress.

The behavior of the wheel under fatigue is very substantially improved because of the total elimination of any concentration of stress due to local forces, such as for example those produced by the particular local shapes due to the fixing devices.

A further advantage of the wheel according to the invention is that by virtue of the frusto-conical shape of the disc 1, it enables the relatively bulky components of the brake system to be readily housed. FIG. 1 shows one of the discs 1, for example the left-hand disc, as shown, provided with a cylindrical extension 17 supporting the rotating parts of the brake 18 which is housed in the said extension. For example, as shown in FIG. 1, the brake 18 may be a disc brake 19 driven in rotation by splines 20 in the cylindrical extension 17, and which engages with friction linings 21 and 22, actuated by a hydraulic mechanism 23 housed in the fixed structure 24 of the brake 18, which structure is for example mounted by means of bolts 25 on the axle 12. Whether the brake is of the drum type or the disc type, the brake components will be easily housed in the space formed by the disc 1 and its cylindrical extension 17.

Furthermore, this type of wheel is thus made-up of two very simple main parts, wholly bodies of revolution, capable of being given functional reliefs, and therefore very easily produced by casting or stamping. The production cost of a wheel of this kind may thus be substantially reduced.

On the other hand, this type of construction enables exactly the same end-plates to be used for wheels of the same diameter and different widths, it being only necessary simply to change the hub in the latter arrangements. The same half-wheels are thus suitable for all tires having the same diameter at the bead, irrespective of the dimensions of the tire tread, and this is an important constructional and commercial advantage.

Finally, in the event of a puncture or bursting of a tire, the forces applied from the ground to the shoulders of the tire, are transmitted directly to the hub. The strength of the wheel in such accidental case is thus much greater than with standard wheels in which these forces are transmitted to the hub through the medium of the rim as it bends. This type of wheel has thus a greater reliability than a wheel of conventional design.

The dismantling of the wheel in two halves according to the invention is particularly easy. It is only necessary to partially deflate the tire, and then unscrew the nut 11 by a sufficient amount on the side chosen for dismantling (in principle, on the side opposite to the brake and therefore opposite the cylindrical extension 17). Under the effect of the remaining air pressure, the disc 1 disengages its female cone 9 from the male cone 10 of the hub 8 up to the moment when, because of the cone, the joint is no longer air-tight and the pressure in the tire falls, permitting it to be removed.

In the case where the tire has burst, the dismantling of the wheel can be effected by means of a conventional extraction tool.

In conclusion, there has been described a wheel adapted for supporting of tubeless tires and having the following advantages as compared with a conventional wheel:

Better transmission of forces and therefore increased reliability in the event of tire bursting;

Improved behavior to fatigue due to the absence of concentration of stresses and of localized fixing means;

Easy housing for the brake;

Low production cost due to the use of very simple identical parts for wheels of the same diameter but different widths;

Weight and inertia reduced to a considerable extent by elimination of the rim;

Easy dismantling.

What I claim is:

A wheel for a tubeless tire mounted thereon comprising a hub, two half-wheels, and brake means, the two half-wheels being supported independently of each other and each comprising a portion in the form of a frusto-conical disc, the two frusto-conical discs being generally symmetrical with respect to the central plane of the tire and each comprising a large diameter circular base and a small diameter circular base, said large base comprising a tire bead-retaining shoulder portion and a tire bead-supporting portion of substantially the same width as the tire bead mounted thereon, the large base of one of said two discs comprising a generally cylindrical extension carrying rotating parts of the brake means and housing said brake means, said hub including tapered male end portions, the small bases of each said disc including elongated tapered female portions each mounted on the tapered portions of the hub and held in assembled relation by an axial nut and comprising airtight packings.

References Cited by the Examiner

UNITED STATES PATENTS

| 1,182,250 | 5/1916 | Clark | 301—63 |
| 2,230,193 | 1/1941 | Shinn | |
| 2,734,778 | 2/1956 | Cook | 301—6 X |

FOREIGN PATENTS 1,322,188  2/1963  France.

BENJAMIN HERSH, *Primary Examiner.*

R. J. JOHNSON, *Assistant Examiner.*